United States Patent [19]
Roeder

[11] 3,718,252
[45] Feb. 27, 1973

[54] PACKAGE OF SCREWS

[75] Inventor: Gerald M. Roeder, Pittsburgh, Pa.

[73] Assignee: United States Steel Corporation

[22] Filed: Dec. 16, 1971

[21] Appl. No.: 208,789

[52] U.S. Cl. ............................................. 206/56 DF
[51] Int. Cl. ............................................. B65d 73/02
[58] Field of Search .................................. 206/56 DF

[56] References Cited

UNITED STATES PATENTS

| | | | |
|---|---|---|---|
| 2,012,615 | 8/1935 | Mason | 206/46 H |
| 3,097,360 | 7/1963 | Carlson, Jr. et al. | 206/56 DF |
| 3,211,284 | 10/1965 | Anstett | 206/56 DF |
| 3,342,327 | 9/1967 | Newton | 206/56 DF |

*Primary Examiner*—Leonard Summer
*Attorney*—Donald S. Ferito

[57] ABSTRACT

A screw package is provided formed of at least two stiff friable membranes arranged in spaced parallel relation each having aligned holes therein. The holes in one of the membranes being shaped to receive the head of a screw and the holes in the other membrane being adapted to receive the tip of a screw. A screw is inserted longitudinally through each pair of aligned holes with its head resting in the shaped hole of one of the membranes and its tip projecting through the other membrane. The heads of the screws are secured in position by a fluid bonding agent which is applied in the fluid state and then hardened. The membranes are sufficiently friable to permit the screws to be singly removed from the membranes as the screw is driven to apply it by the rotating motion of a driving means, such as a screwdriver.

5 Claims, 4 Drawing Figures

PATENTED FEB 27 1973 3,718,252

PACKAGE OF SCREWS

The present invention relates generally to material handling and more particularly to an improved screw package especially suitable for handling a plurality of screws and positioning them individually over the desired point of installation.

Prior to my invention, when a workman used screws in the construction of houses and buildings or in the assembly of enclosures or containers, the workman would secure a handful of screws from a box in which the screws were loosely packed. Then he would individually orient each screw with his fingers as he positioned it over a desired point of application. Then during the actual driving process, the workman's fingers would be in contact with the turning screw and with the turning and descending tip of a screwdriver which could be power or manually operated. This procedure, when a powered screwdriver was used, was not only dangerous for the workman but was excessively time consuming as well since it required so much effort on the part of the workman.

It is, accordingly, the primary object of my invention to provide a screw package wherein a plurality of screws are held together in alignment in a frangible material which is easily manipulated to position an individual screw over a desired point for installation and held there by grasping the package or a handle thereon as the screw is driven and separated from the package while it is being driven.

This and other objects will become more apparent after referring to the following specification and drawing in which.

Figure 1:
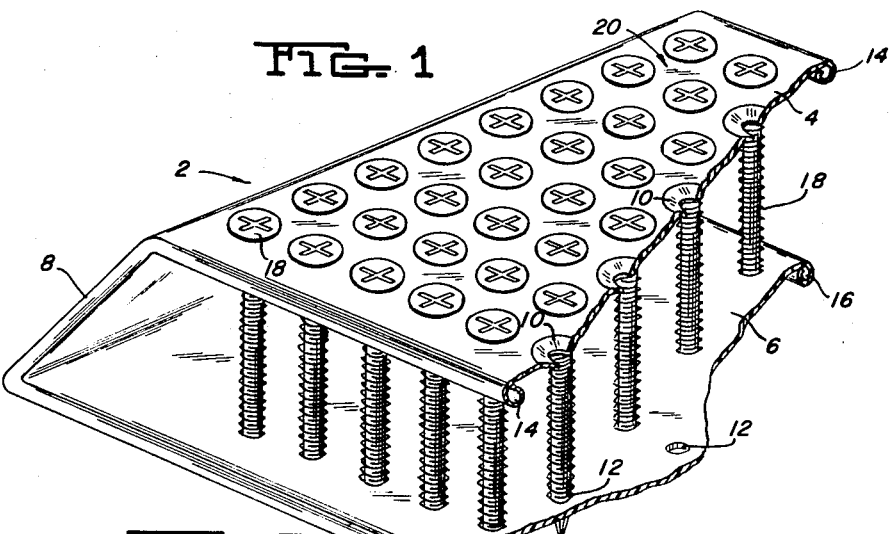
FIG. 1 is a partial perspective view of the package of my invention.
Figure 2:
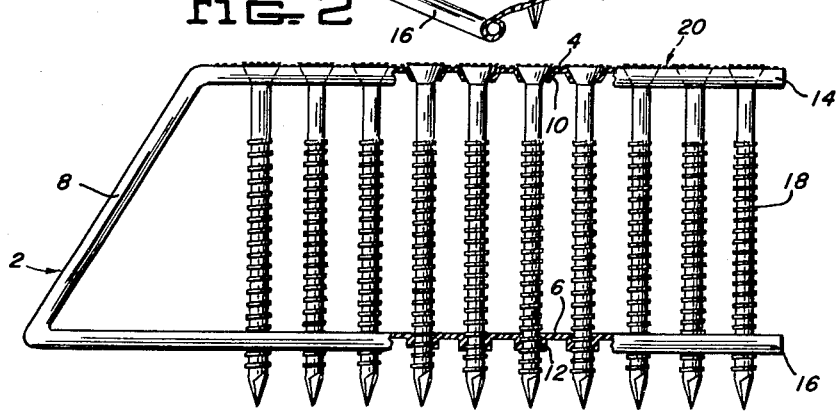
FIG. 2 is a side elevational view of the package of the invention.

Referring more particularly to the drawing, reference numeral 2 designates generally a preferred embodiment of my invention consisting of a single sheet of stiff frangible material, such as stiffened paper, styrofoam or plastic material. The sheet is folded to form an upper membrane 4, a lower membrane 6 spaced from and substantially parallel with membrane 4, and a handle 8 connecting the two membranes, as best shown in FIG. 2.

The upper and lower membranes 4 and 6 are provided with a plurality of holes 10 and 12, respectively, in an area bounded on two opposite sides 14 and 16, respectively, by rolled edges to provide additional rigidity.

Figure 4:
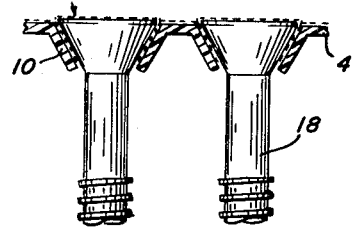
FIG. 4 is an enlarged fragmentary sectional view.

A screw 18, which may be of a self-drilling, self-tapping type, is disposed longitudinally in each pair of aligned holes 10 and 12 in the membranes 4 and 6 with the head of the screw resting in a hole 10 in the upper surface of the membrane 4 and the bottom tip of the screw projecting through the aligned hole 12 in the lower membrane 6. As best shown in FIG. 4, the holes 10 in membrane 4 are tapered inwardly so as to accommodate the tapered lower portion of the head of each screw 18.

As best shown in FIG. 4, the heads of the screws 18 are held in position by a fluid bonding agent 20, such as lacquer, which is applied to the screw heads in fluid form and then allowed to harden. If desired, the bonding agent may be applied to any other part of the screw or package.

Figure 3:
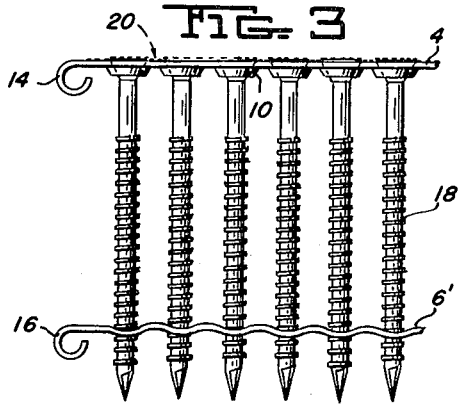
FIG. 3 is a partial front elevational view of a modified embodiment of the invention.

FIG. 3 shows a modified embodiment of the package of the invention in which the lower membrane 6' is corrugated to provide greater rigidity to the package.

During use, the package of the invention is positioned on the work area in such a way that a corner screw is located over an intended point of application. The tip of a screwdriver (powered or manually operated) is fitted into the slot in the head of the screw. The screwdriver is actuated and the package is withdrawn approximately an inch away from the work area. The screw is driven in a conventional manner. The package is then moved to the next application point and the next screw is driven in similar manner.

It will be obvious that the package of the invention speeds up the application of screws and greatly lessens the possibility of injury to the workman applying the screws when a powered screwdriver is used.

Although I have shown the use of lacquer as the bonding agent, it will be understood that a suitable plasticizer may be used for this purpose.

The package may be formed from a single sheet of material as I have shown or alternatively a number of separate membranes may be assembled to provide the structure.

Further, a solid package may be provided by molding a liquid plaster, rubber cement, or soap about the screws and allowing the liquid plaster, rubber cement or soap to dry in air or by the application of suitable heat or other solidifying means.

Where soap s utilized to form the solid package, the soap would provide lubrication to the screws as they were being applied in the work area. This self-lubricating function would increase the speed at which the screws could be driven.

While I have shown but two embodiments of my invention, other adaptations and modifications may be made without departing from the scope of the following claims.

I claim:

1. A screw package comprising a pair of spaced parallel planar membranes of stiff friable material, a plurality of aligned holes in said membranes, a screw longitudinally disposed in each pair of said aligned holes with its head resting against the surface of said one of said membranes and its shank projecting from said one of said membranes and its tip projecting through and beyond the hole in said other of said membranes aligned with the hole in said one of said membranes through which the shank portion of the screw projects, said screws being secured in position by a fluid bonding agent applied in the fluid state and then hardened.

2. A package as defined by claim 1 including a handle connecting said pair of membranes.

3. A package as defined by claim 1 in which said other of said membranes is corrugated.

4. A package as defined by claim 1 in which at least two opposite edges of each of said membranes is rolled to provide added rigidity.

5. A package as defined by claim 1 in which each of said holes in said one of said membranes is tapered to conform with the portion of a screw adjacent the head thereof.

* * * * *